(12) United States Patent
Watanabe et al.

(10) Patent No.: US 7,619,854 B2
(45) Date of Patent: Nov. 17, 2009

(54) PRODUCT INCLUDING FILMED SCREW

(75) Inventors: Keiji Watanabe, Kawasaki (JP); Keiji Aruga, Kawasaki (JP); Hiroshi Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 705 days.

(21) Appl. No.: 11/489,697

(22) Filed: Jul. 19, 2006

(65) Prior Publication Data
US 2007/0253291 A1 Nov. 1, 2007

(30) Foreign Application Priority Data
Apr. 26, 2006 (JP) .............................. 2006-121567

(51) Int. Cl.
*G11B 17/04* (2006.01)
(52) U.S. Cl. .................................................. 360/97.02
(58) Field of Classification Search ...................... None
See application file for complete search history.

(56) References Cited

U.S. PATENT DOCUMENTS

| 5,379,660 | A | * | 1/1995 | Ishikawa | .................... | 74/89.36 |
| 5,517,376 | A | * | 5/1996 | Green | .................... | 360/98.08 |
| 6,007,286 | A | * | 12/1999 | Toyota et al. | .............. | 411/428 |
| 6,267,050 | B1 | * | 7/2001 | Brewer | ........................ | 100/257 |
| 6,397,981 | B1 | * | 6/2002 | Tamasho et al. | ........... | 188/71.9 |
| 6,788,495 | B2 | * | 9/2004 | Aiello | ..................... | 360/99.12 |
| 6,865,963 | B2 | * | 3/2005 | Takanohashi et al. | ...... | 74/89.44 |
| 7,237,652 | B2 | * | 7/2007 | Takanohashi et al. | ...... | 184/6.12 |
| 2005/0209480 | A1 | | 9/2005 | Nakata | | |
| 2005/0255186 | A1 | * | 11/2005 | Hiraga | ........................ | 425/542 |

FOREIGN PATENT DOCUMENTS

| JP | 8-226516 | 9/1996 |
| JP | 2001-143253 | 5/2001 |
| JP | 2001-248708 | 9/2001 |
| JP | 2004-156028 | 6/2004 |

* cited by examiner

*Primary Examiner*—Allen T Cao
(74) *Attorney, Agent, or Firm*—Greer, Burns & Crain, Ltd.

(57) ABSTRACT

A first component defines a threaded bore. A second component is kept in contact with the first component. A clamping screw penetrates through the second component and is screwed in the threaded bore. A lubricating agent film is interposed between the threaded bore and the clamping screw. The lubricating agent film is made of a macromolecular compound having a polar end group. The lubricating agent film serves to reduce the friction between the threaded bore and the clamping screw. Generation of dust is prevented when the clamping screw is being screwed into the threaded bore. In addition, the clamping screw exhibits a larger axial force at a certain amount of a fastening torque as compared with a conventional clamping screw. A larger axial force can thus be applied to hold the second component onto the first component.

10 Claims, 5 Drawing Sheets

PRODUCT INCLUDING FILMED SCREW

BACKGROUND OF THE INVENTION

1. Field of the Invention

The present invention relates to a product comprising a first component defining a threaded bore, a second component kept in contact with the first component, and a clamping screw screwed in the threaded bore of the first component to fix the second component onto the first component.

2. Description of the Prior Art

A magnetic recording disk is mounted on a spindle hub in a method of assembling a hard disk drive, HDD, for example. The magnetic recording disk or disks are received on a flange at the lower end of the spindle hub. A clamp is fixed to the upper end of the spindle hub. Clamping screws are utilized to fix the clamp. The clamp serves to urge the magnetic recording disk or disks against the flange. The magnetic recording disk or disks are in this manner held between the clamp and the flange.

The clamping screws are subjected to a washing treatment beforehand. The surface of the clamping screw is degreased. This results in a reliable avoidance of diffusion of oil particles from the clamping screw within the enclosure of the hard disk drive. A relatively large friction can be generated between the degreased clamping screw and the threaded bore. However, a relative movement is caused between the spindle hub and the magnetic recording disk in response to the application of an impact to the hard disk drive. The center of gravity of the rotor including the spindle hub and the magnetic recording disk or disks gets offset from the rotation axis of the rotor. This results in a rotational instability of the magnetic recording disk or disks.

SUMMARY OF THE INVENTION

It is accordingly an object of the present invention to provide a product and a storage medium drive enabling an increase in the axial force of a clamping screw. It is also an object of the present invention to provide a filmed screw and a method of surface treatment for a clamping screw, significantly contributing to realization of the product and the storage medium drive.

According to a first aspect of the present invention, there is provided a product comprising: a first component defining a threaded bore; a second component kept in contact with the first component; a clamping screw screwed in the threaded bore of the first component for fixation of the second component onto the first component; and a lubricating agent film located at least in a space between the threaded bore and the clamping screw, the lubricating agent film made of a macromolecular compound having a polar end group.

The lubricating agent film is interposed between the threaded bore and the clamping screw. The lubricating agent film serves to reduce the friction between the threaded bore and the clamping screw. Generation of dust is prevented when the clamping screw is being screwed into the threaded bore. In addition, the inventors have demonstrated that the clamping screw exhibits a larger axial force at a certain amount of a fastening torque as compared with a conventional clamping screw. A larger axial force can thus be applied to hold the second component onto the first component.

The lubricating agent film may also be located in a space between the clamping screw and the second component in the product. This structure enables a reduction in the friction between the clamping screw and the second component. The clamping screw is allowed to enjoy a still larger axial force.

The macromolecular compound may be perfluoropolyether (PFPE). The thickness of the lubricating agent film may be set in a range from 0.5 nm to 10.0 nm. Such a lubricating agent film can exhibit a reliable lubricating effect. If the lubricating agent film has a thickness larger than 10.0 nm, the macromolecular compounds contained in the lubricating agent film diffuse. The lubricating agent film may be formed on the surface of the clamping screw.

The product may be incorporated in a storage medium drive. In this case, the storage medium drive may comprise: an enclosure; a first component enclosed in the enclosure, the first component defining a threaded bore; a second component enclosed in the enclosure, the second component kept in contact with the first component; a clamping screw screwed in the threaded bore of the first component for fixation of the second component onto the first component; and a lubricating agent film located at least in a space between the threaded bore and the clamping screw, the lubricating agent film made of a macromolecular compound having a polar end group.

The storage medium drive enables a reduction in the friction between the threaded bore and the clamping screw with the assistance of the lubricating agent film in the same manner as described above. Generation of dust is prevented when the clamping screw is being screwed into the threaded bore. Moreover, the clamping screw exhibits a larger axial force at a certain fastening torque as compared with a conventional clamping screw. A larger axial force can thus be applied to hold the second component onto the first component.

The macromolecular compound may be perfluoropolyether. The employment of perfluoropolyether results in a reliable prevention of diffusion of macromolecules contained in the lubricating agent film in the inner space of the enclosure. A clean atmosphere can be kept in the enclosure. The thickness of the lubricating agent film may be set in a range from 0.5 nm to 10.0 nm. The lubricating agent film may be formed on the surface of the clamping screw.

According to a second aspect of the present invention, there is provided a product comprising: a first component defining a threaded bore; a second component kept in contact with the first component; a clamping screw screwed in the threaded bore of the first component for urging the second component against the first component; and a lubricating agent film located in a space between the clamping screw and the second component, the lubricating agent film made of a macromolecular compound having a polar end group.

The lubricating agent film is interposed between the clamping screw and the second component. The lubricating agent film serves to reduce the friction between the clamping screw and the second component. The inventors have revealed that a relative movement of a certain amount can be realized between the first and second components when the clamping screw is provisionally screwed, for example. This cannot be achieved with a conventional clamping screw. A relative position can reliably be adjusted between the first and second components, for example, as expected.

The macromolecular compound may be perfluoropolyether in the product. The thickness of the lubricating agent film may be set in a range from 0.5 nm to 10.0 nm in the same manner as described above. The lubricating agent film may be formed on the surface of the clamping screw.

The product may be incorporated in a storage medium drive. In this case, the storage medium drive may comprise: an enclosure; a rotating body enclosed in the enclosure, the rotating body supported on the enclosure for relative rotation; a storage medium enclosed in the enclosure, the storage medium mounted on the rotating body; a clamp fixed to the tip end of the rotating body, the clamp designed to urge the storage medium against a flange of the rotating body; a clamping screw screwed in the rotating body to urge the clamp toward the flange; and a lubricating agent film located in a space between the clamping screw and the clamp, the lubricating agent film made of a macromolecular compound having a polar end group.

The storage medium drive enables a reduction in the friction between the clamping screw and the clamp with the assistance of the lubricating agent film. The clamp serves to urge the storage medium against the flange. When the clamping screw is provisionally screwed, for example, a relative displacement is allowed between the storage medium and the rotating body as well as the flange. A rotational instability of the storage medium can be adjusted as expected, for example. The center of gravity of the storage medium can be aligned at the rotation axis of the rotating body as expected.

A specific filmed screw may be provided to realize the aforementioned product and storage medium drive. The filmed screw may comprise: a clamping screw; and a lubricating agent film formed on the surface of the clamping screw, the lubricating agent film made of a macromolecular compound having a polar end group. Surface processing may be employed to form such a lubricating agent film, made of a macromolecular compound having a polar end group, on the surface of the clamping screw.

According to a third aspect of the present invention, there is provided a method of aligning the center of gravity of a storage medium, comprising: screwing a clamping screw in a threaded bore defined in a rotor of a spindle motor in a storage medium drive, the clamping screw penetrating through a clamp, the clamp serving to urge a storage medium against a flange of the rotor; driving the spindle motor for rotation of the storage medium so as to detect a rotational instability of the storage medium; and applying an impact to the storage medium drive in a direction perpendicular to the rotation axis of the rotor depending on the rotational instability, wherein a lubricating agent film is located in a space between the clamping screw and the clamp, the lubricating agent film made of a macromolecular compound having a polar end group.

The clamping screw is provisionally screwed into the threaded bore. The clamp serves to urge the storage medium against the flange. The spindle motor is then driven to rotate for the rotation of the storage medium. If a tolerance exists between the storage medium and the rotor, a rotational instability of the storage medium is detected, for example. An impact is applied to the storage medium drive in a direction perpendicular to the rotation axis of the spindle motor. The inventors have demonstrated that the rotor, including the storage medium, the spindle motor and the clamp, is allowed to enjoy a displacement of the center of gravity at a constant rate for every pulse of the impact. The center of gravity moves toward the rotation axis so that the a rotational instability of the storage medium can be adjusted as expected.

Furthermore, the lubricating agent film enables a reduction in the friction as described above. This serves to prevent the clamp from shifting during the tightening of the clamping screw with the regular fastening torque larger than the provisional fastening torque. The balance of the rotation of the storage medium can in this manner be maintained even when the clamping screw is being fully screwed. In addition, the lubricating agent film serves to enhance the axial force of the clamping screw. The clamping screw enables a reliable fixation of the clamp and the storage medium. The balance of the rotation of the storage medium can be maintained regardless of the application of an impact to the storage medium drive.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
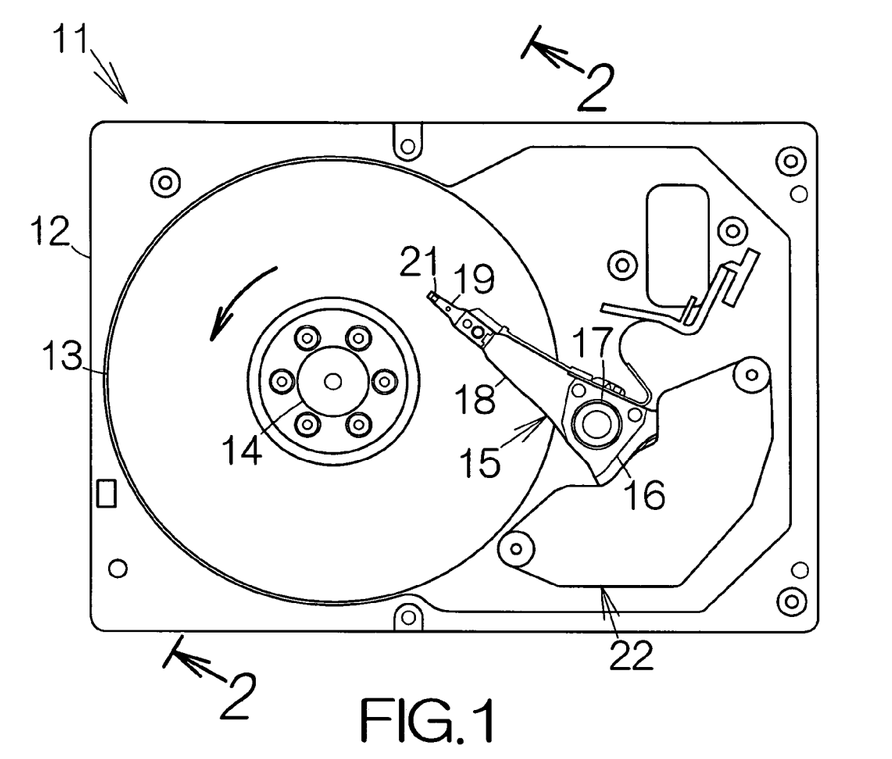
FIG. 1 is a plan view schematically illustrating the inner structure of a hard disk drive (HDD) as an example of a storage medium drive according to the present invention.

FIG. 1 schematically illustrates the inner structure of a hard disk drive, HDD, 11 as an example of a storage medium drive according to the present invention. The hard disk drive 11 includes a box-shaped enclosure body 12 defining an inner space in the form of a flat parallelepiped, for example. The enclosure body 12 may be made of a metallic material such as aluminum, for example. Molding process may be employed to form the enclosure body 12. An enclosure cover, not shown, is coupled to the enclosure body 12. The enclosure cover closes the opening of the enclosure body 12. Pressing process may be employed to form the enclosure cover out of a plate material, for example. The enclosure body 12 and the enclosure cover in combination establish an enclosure.

At least one magnetic recording disk 13 as a storage medium is enclosed within the inner space of the enclosure body 12. The magnetic recording disk or disks 13 are mounted on the driving shaft of a spindle motor 14. The spindle motor 14 drives the magnetic recording disk or disks 13 at a higher revolution speed such as 5,400 rpm, 7,200 rpm, 10,000 rpm, 15,000 rpm, or the like.

A head actuator member, namely a carriage 15, is also incorporated within the inner space of the enclosure body 12. The carriage 15 includes a carriage block 16. The carriage block 16 is supported on a vertical support shaft 17 for relative rotation. Carriage arms 18 are defined in the carriage block 16. The carriage arms 18 are designed to extend in the horizontal direction from the vertical support shaft 17. The carriage block 16 may be made of aluminum, for example. Molding process may be employed to form the carriage block 16, for example.

A head suspension 19 is attached to the front or tip end of the individual carriage arm 18. The head suspension 19 is designed to extend forward from the carriage arm 18. A so-called gimbal spring, not shown, is coupled to the front or tip end of the head suspension 19. A flying head slider 21 is fixed to the surface of the gimbal spring. The gimbal spring allows the flying head slider 21 to change its attitude relative to the head suspension 19.

An electromagnetic transducer, not shown, is mounted on the flying head slider 21. The electromagnetic transducer includes a write element and a read element. The write element may include a thin film magnetic head designed to write magnetic bit data into the magnetic recording disk 13 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 13 by utilizing variation in the electric resistance of a spin valve film or a tunnel-junction film, for example.

When the magnetic recording disk 13 rotates, the flying head slider 21 is allowed to receive an airflow generated along the rotating magnetic recording disk 13. The airflow serves to generate a positive pressure or a lift as well as a negative pressure on the flying head slider 21. The flying head slider 21 is thus allowed to keep flying above the surface of the magnetic recording disk 13 during the rotation of the magnetic recording disk 13 at a higher stability established by the balance between the urging force of the head suspension 19 and the combination of the lift and the negative pressure.

A power source or voice coil motor, VCM, 22 is coupled to the carriage block 16. The voice coil motor 22 serves to drive the carriage block 16 around the vertical support shaft 17. The rotation of the carriage block 16 allows the carriage arms 18 and the head suspensions 19 to swing. When the carriage arm 18 swings around the vertical support shaft 17, the flying head slider 21 is allowed to move along the radial direction of the magnetic recording disk 13. The electromagnetic transducer on the flying head slider 21 can thus be positioned right above a target recording track on the magnetic recording disk 13.

Figure 2:
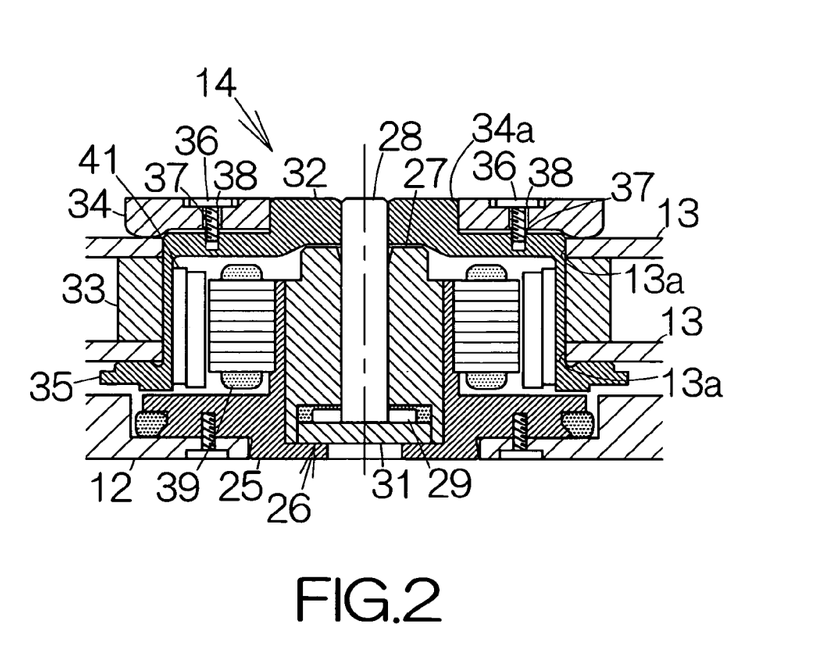
FIG. 2 is a sectional view taken along the line 2-2 in FIG. 1.

Next, a detailed description will be made on the structure of the spindle motor 14. As shown in FIG. 2, the spindle motor 14 includes a bracket 25 fixed to the bottom plate of the enclosure body 12, for example. A so-called fluid bearing 26 is incorporated in the bracket 25. A rotation shaft 28 is received in a cylindrical space within a sleeve 27 in the fluid bearing 26. Here, the bracket 25 and the sleeve 27 in combination serve as the stator of the spindle motor 14.

A fluid such as a lubricant fills a gap between the sleeve 27 and the rotation shaft 28, for example. The rotation shaft 28 is allowed to rotate around its rotation axis at a high revolution speed in the sleeve 27. A thrust flange 29 is attached to the lower end of the rotation shaft 28. The thrust flange 29 is designed to extend in a centrifugal direction from the rotation axis of the rotation shaft 28. The thrust flange 29 is received on a thrust plate 31. The fluid also fills a gap between the thrust flange 29 and the thrust plate 31.

A rotating body, namely spindle hub 32, is mounted on the rotation shaft 28. The spindle hub 32 serves as a first component of the claimed invention. The magnetic recording disks 13 are mounted on the spindle hub 32, for example. A through hole 13a is formed at the center of the individual magnetic recording disk 13. The through hole 13a receives insertion of the spindle hub 32. A spacer 33 is interposed between the adjacent ones of the magnetic recording disks 13. The spacer 33 serves to keep the magnetic recording disks 13 spaced from each other at a certain interval.

A clamp 34 is mounted on the upper end of the spindle hub 32. A through hole 34a is formed at the center of the clamp 34. The through hole 34a receives insertion of the spindle hub 32. The magnetic recording disks 13 and the spacer or spacers 33 are clamped between a clamp 34 and a flange 35 of the spindle hub 32. The rotation shaft 28, the spindle hub 32, the clamp 34, the spacer or spacers 33, and the magnetic recording disks 13 in combination serve as the rotor of the spindle motor 14. The clamp 34 serves as a second component of the claimed invention.

Six, for example, clamping screws 36 are utilized to fix the clamp 34 to the spindle hub 32. The clamping screws 36 are screwed into threaded bores 37 defined in the spindle hub 32. Through holes 38 may be defined in the clamp 34 to receive insertion of the clamping screws 36. The clamping screws 36 may be made of a metallic material such as stainless steel or the like. The spindle hub 32, the clamp 34 and the clamping screws 36 in combination serve as a product of the present invention.

Coils 39 are fixed to the bracket 25 at the periphery of the rotation shaft 28. Permanent magnets 41 are fixed to the spindle hub 32. The permanent magnets 41 are located on the inside surface of the spindle hub 32 so that the permanent magnets 41 can be opposed to the coils 39. A magnetic field is generated in the coils 39 in response to the supply of electric current to the coils 39. The magnetic field of the coils 39 serves to drive the permanent magnets 41. The spindle hub 32 is thus driven for rotation around the rotation axis of the rotation shaft 28. This results in the rotation of the magnetic recording disks 13.

Figure 3:
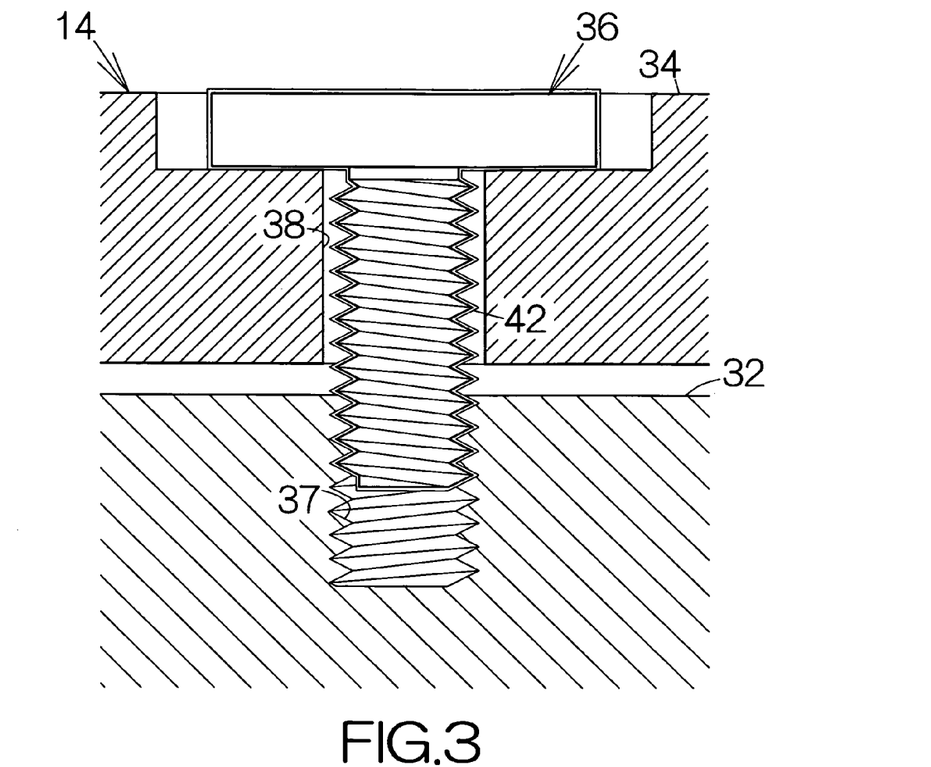
FIG. 3 is a partial enlarged sectional view schematically illustrating the structure of a clamping screw.

As shown in FIG. 3, a lubricating agent film 42 is formed on the surface of the individual clamping screw 36. The lubricating agent film 42 covers over the entire surfaces of the screw head and the screw stem of the clamping screw 36. The lubricating agent film 42 is located in a space between the screw head and the clamp 34. The screw head has the bottom surface contacting with the surface of clamp 34. Likewise, the lubricating agent film 42 is located in a space between the screw stem and the inside surface of the threaded bore 37. A predetermined gap may be defined in a space between the screw stem and the inside surface of the through hole 38 of the clamp 34.

The lubricating agent film 42 may be made of a macromolecular compound having a polar end group. A perfluoropolyether (PFPE) film may be employed as the lubricating agent film 42. Specifically, the perfluoropolyether preferably has a straight-chain structure having two hydroxyl groups at each end. Perfluoropolyether has a relatively small surface free energy. The lubricating agent film 42 thus enables a reduction in the friction between the clamping screw 36 and the inside surface of the threaded bore 37. A lubricating effect is reliably realized.

The average thickness of the lubricating agent film 42 is set in a range from 0.5 nm to 10.0 nm, for example. The thickness smaller than 0.5 nm leads to a reduction in a lubricating effect. The thickness larger than 10.0 nm leads to diffusion of macromolecular compounds contained in the lubricating agent film 42 in the inner space of the enclosure body 12. The diffusing macromolecular compounds stick to the medium-opposed surfaces of the flying head sliders 21, for example. This causes contact or collision of the flying head sliders 21 with the magnetic recording disks 13.

Alternatively, the lubricating agent film 42 may be made of a macromolecular compound having at least one of a hydroxyl group, an amino group, a carboxyl group, an alkoxy group, a piperonyl group, and an amine salt, all serving as an end group, for example. Such an end group allows the lubricating agent film 42 to firmly stick to the surface of the clamping screw 36. The macromolecules contained in the lubricating agent film 42 can surely be prevented from diffusing in the inner space of the enclosure body 12.

The molecular weight of the macromolecular compound may be set in a range from 1,000 to 5,000 approximately in number average molecular weight, for example. The molecular weight smaller than 1,000 leads to an increase in volatility. This results in a reduction of a lubricating effect. The molecular weight larger than 5,000 leads to an increase in the viscosity of the macromolecular compound. The lubricating agent film 42 cannot be formed in a sufficiently smaller thickness.

The individual clamping screw 36 is covered with the lubricating agent film 42 in the hard disk drive 11. The lubricating agent film 42 enables a reduction in the friction between the clamping screw 36 and the inside surface of the threaded bore 37. Generation of dust is prevented when the clamping screw 36 is screwed in the assembling process of the hard disk drive 11. Furthermore, the macromolecular compounds contained in the lubricating agent film 42 are prevented from diffusing in the inner space of the enclosure body 12. A clean atmosphere can thus be kept within the enclosure body 12.

Next, a detailed description will be made on a method of making the lubricating agent film 42. The clamping screws 36 are first subjected to a washing treatment as a pretreatment. The surface of the clamping screw 36 is degreased in the process of the washing treatment. A solution including a lubricating agent is then prepared. A fluorine resin may be dissolved in a fluorine solvent in this case. The concentration of the fluorine resin may be set equal to or smaller than 0.1 wt %. The clamping screws 36 are immersed in the solution for a predetermined period of time. The clamping screws 36 are pulled out of the solution at a predetermined speed.

The clamping screws 36 are then subjected to a heat treatment. The lubricating agent film 42 is formed on the surface of the clamping screw 36 in this manner. The temperature of the heat treatment may be set in a range from 80 degrees Celsius to 300 degrees Celsius, for example. The heat treatment of the temperature below 80 degrees Celsius cannot allow the lubricating agent film 42 to attach to the surface of the clamping screw 36 with a sufficient firmness. The heat treatment of the temperature above 300 degrees Celsius leads to an increase in the possibility of dissolution of the macromolecular compounds contained in the lubricating agent film 42.

The lubricating agent film 42 is then subjected to irradiation of an electromagnetic wave having the wavelength equal to or smaller than 436 nm. Their radiation serves to enhance the firmness of the attachment of the lubricating agent film 42 to the surface of the clamping screw 36. The wavelength of the electromagnetic wave may be adjusted depending on the structure of the macromolecular compound. If the electromagnetic wave is longer than 436 nm, the lubricating agent film 42 cannot enjoy a sufficient energy.

The surface of the lubricating agent film 42 is then subjected to a washing treatment. The lubricating agent film 42 is exposed to a specific solvent. The solvent enables dissolution of the macromolecular compounds in a bulk state within the lubricating agent film 42. Some of the macromolecular compounds insufficiently attaching to the surface of the clamping screw 36 is dissolved in the lubricating agent film 42. The washing treatment serves to dissolve such macromolecular compounds. The surface treatment is in this manner applied to the surfaces of the clamping screws 36.

Next, the inventors have observed the relationship between the fastening torque and the clamping force of the clamping screw 36. The inventors prepared first and second specific examples and a comparative example. The lubricating agent film 42 was formed on the surface of the individual clamping screw 36 in the first and second specific examples. The lubricating agent film 42 was not subjected to a washing treatment in the first example at the final stage in the process of making the lubricating agent film 42. A clamping screw was only subjected to a washing treatment as a pretreatment in the comparative example. The clamping screw was degreased in the pretreatment. Formation of the lubricating agent film 42 was omitted in the comparative example.

A fluorine resin was dissolved in a fluorine solvent at the content of 0.01 wt % to provide the solution for the formation of the lubricating agent film 42. Vertrel®, produced by DU PONT-MITSUI FLUOROCHEMICALS COMPANY, LTD., was employed as the fluorine solvent. Fomblin Z TETRAOL®, produced by Solvay Solexis Inc., was employed as the fluorine resin. The clamping screw 36 was immersed in the solution. The clamping screw 36 was then subjected to a heat treatment of 130 degrees Celsius for a period of 0.8 hours. The lubricating agent film 42 having the thickness of 2 nm was in this manner formed on the clamping screw 36.

The clamping screws 36 according to the first and second specific examples and the comparative example were screwed into the threaded bores 37 of the spindle hubs 32, respectively. A predetermined tool was utilized for screwing. The rotation of the clamping screws allows generation of a predetermined axial force in the clamping screws, respectively. This results in generation of an urging force or clamping force of the clamp 34 against the surface of the magnetic recording disk 13. The clamping force was measured for the first, second and comparative examples. A load cell was utilized for the measurement.

Figure 4:
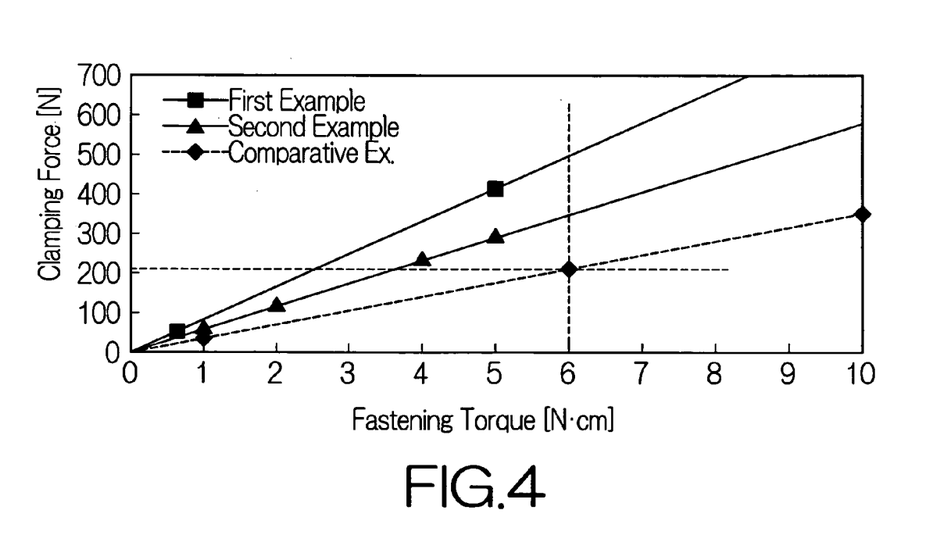
FIG. 4 is a graph showing the relationship between a fastening torque and a clamping force.

As shown in FIG. 4, the first and second examples demonstrated a larger clamping force as compared with the comparative example at a certain intensity of the fastening torque. In other words, the first and second specific examples required a smaller fastening torque to realize a certain clamping force as compared with the comparative example. It has been demonstrated that the clamping screws 36 according to the first and second specific examples allow a larger clamping force or axial force.

Figure 5:
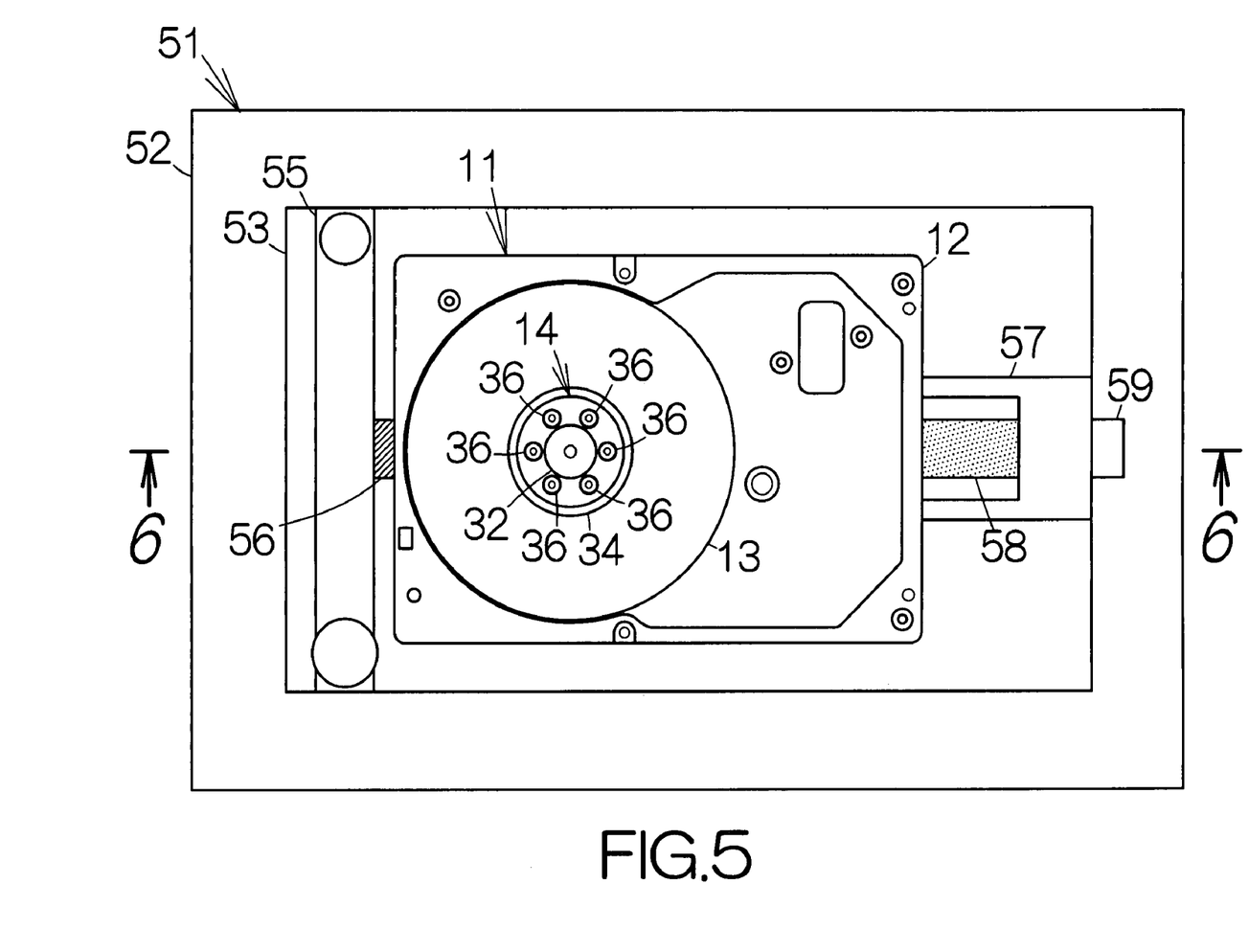
FIG. 5 is a plan view schematically illustrating a balancing apparatus designed to receive the hard disk drive.

Now, assume that the weight balance of the magnetic recording disks 13 is adjusted in the assembling process of the hard disk drive 11. As shown in FIG. 5, the magnetic recording disks 13 and the clamp 34 are mounted on the spindle hub 32 in the hard disk drive 11. The clamping screws 36 are provisionally screwed in the spindle hub 32. A predetermined tool is utilized to screw the clamping screws 36. When the clamping screw 36 has provisionally been screwed, the fastening torque of the clamping screw 36 is set approximately half of the regular fastening torque. The regular fastening torque is the torque realized when the clamping screw 36 is fully screwed. The hard disk drive 11 in this status is mounted on a balancing apparatus 51.

Figure 6:
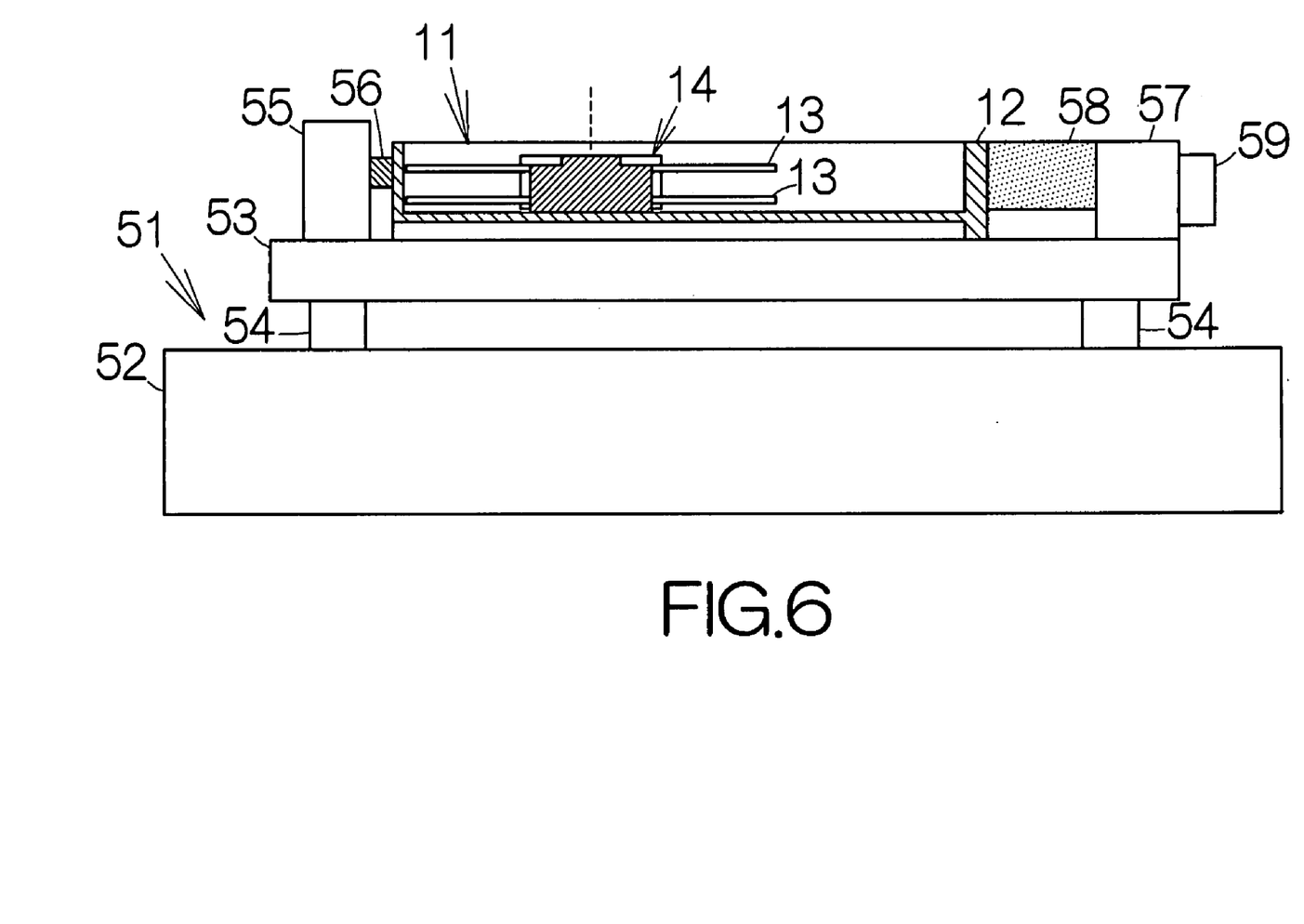
FIG. 6 is a sectional view taken along the line 6-6 in FIG. 5.

Referring also to FIG. 6, the balancing apparatus 51 includes a stage 52. A support plate 53 is located on the stage 52. Elastic members 54 are utilized to support the support plate 53 on the stage 52. Coil springs, for example, may be employed as the elastic members 54. The hard disk drive 11 is set on the support plate 53 in a horizontal attitude. A first clamping member 55 is located on the support member 53. The first clamping member 55 receives one of the opposite sides of the hard disk drive 11 through an elastic body 56.

The other opposite side of the hard disk drive 11 is received on a second clamping member 57. The second clamping member 57 incorporates a piezoelectric actuator 58. The piezoelectric actuator 58 is kept in contact with the other opposite side of the hard disk drive 11. The piezoelectric actuator 58 is designed to shrink and elongate to apply an impact to the hard disk drive 11 from the outside of the enclosure body 12 in a direction parallel to the surface of the support plate 53. The impact is applied in a direction perpendicular to the rotation axis of the rotation shaft 28 of the spindle motor 14.

An acceleration sensor 59 is coupled to the second clamping member 57. The acceleration sensor 59 is designed to detect vibration of the hard disk drive 11. The detected value of the acceleration is output to a computer, not shown. The computer is designed to detect a rotational instability of the magnetic recording disks 13 based on the detected value from the acceleration sensor 59. The rotational instability is shown as a phase (an angle) and the amount of displacement (the amount of imbalance).

The spindle hub 32 or magnetic recording disks 13 are driven to rotate in response to the supply of electric current to the coils 39 of the spindle motor 14. Tolerances cause the center of gravity of the entire rotor, including the spindle hub 32 and the magnetic recording disks 13, to shift from the rotation axis of the rotation shaft 28. A tolerance is allowed between the inner diameter of the through holes 13a of the magnetic recording disks 13 and the outer diameter of the spindle hub 32. A tolerance is allowed between the inner diameter of the through hole 34a of the clamp 34 and the outer diameter of the spindle hub 32. The shift or offset of the center of gravity of the rotor causes a rotational instability of the magnetic recording disks 13. The hard disk drive 11 thus suffers from vibration. The acceleration sensor 59 detects the vibration. The detected value of the acceleration is output to the computer.

The computer detects a rotational instability based on the detected value of the acceleration. A driving voltage is supplied to the piezoelectric actuator 58 depending on the rotational instability. The piezoelectric actuator 58 shrinks and elongates to apply an impact to the hard disk drive 11 at a predetermined timing. The piezoelectric actuator 58 drives the magnetic recording disks 13 and the clamp 34 for the horizontal movement. The center of gravity of the entire rotor thus gradually moves toward the rotation axis of the rotation shaft 28. This process is repeated until the rotational instability is suppressed to a predetermined level or lower. The rotation of the magnetic recording disks 13 is in this manner balanced. The clamping screws 36 are thereafter fully screwed with the regular fastening torque.

The inventors have observed the effects of the clamping screws 36. The inventors prepared a specific example of the invention and a comparative example. The clamping screws 36 were provisionally screwed in the hard disk drive 11 according to the specific example. The clamping screw 36 was covered with the lubricating agent film 42. A conventional clamping screw was provisionally screwed in a hard disk drive according to the comparative example. Formation of the lubricating agent film 42 was omitted in the comparative example. The hard disk drive 11 of the specific example and the hard disk drive of the comparative example were individually mounted on the aforementioned balancing apparatus 51. The balancing apparatus 51 operates to balance the rotation of the magnetic recording disks 13. An even clamping force was set in the hard disk drive 11 of the specific example and the hard disk drive of the comparative example. The centroid of the entire rotor was calculated based on the detected value from the acceleration sensor 59.

Figure 7:
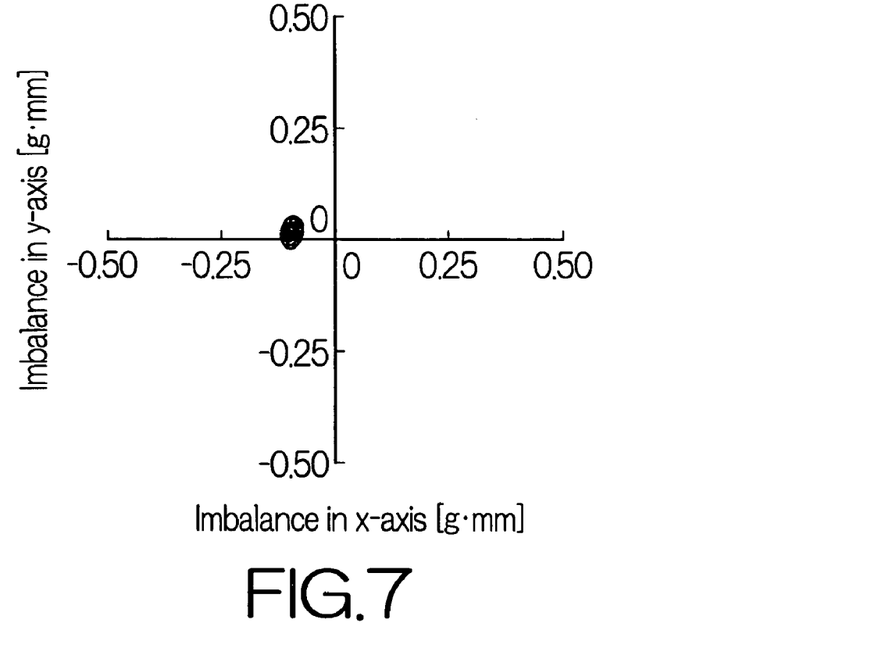
FIG. 7 is a graph showing the centroid of the entire rotor when conventional clamping screws are employed to fix a clamp.
Figure 8:
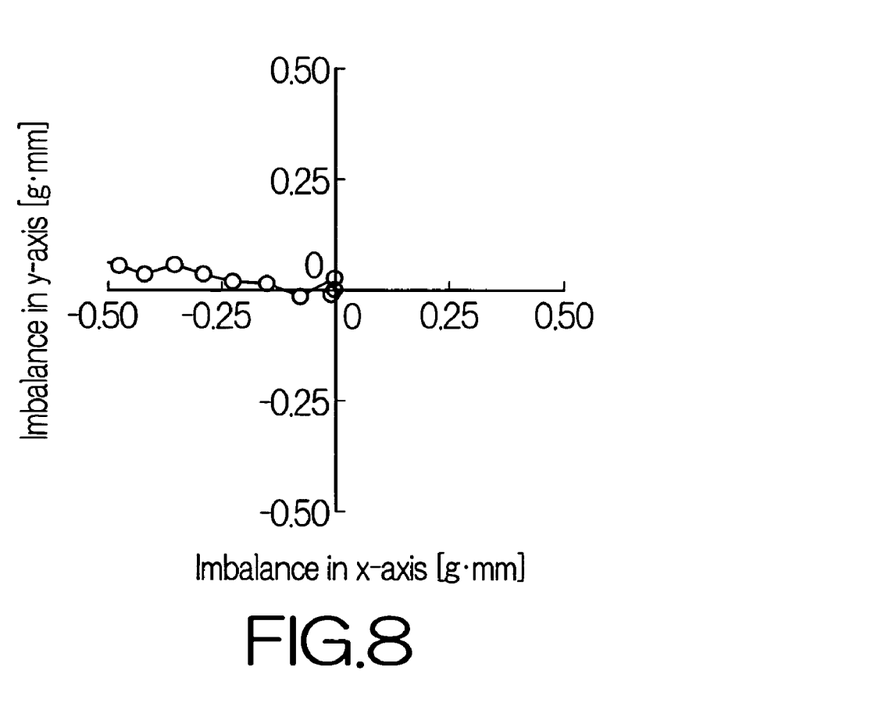
FIG. 8 is a graph showing the centroid of the entire rotor when the clamping screw of the present invention are employed to fix a clamp.

As shown in FIG. 7, the center of gravity of the entire rotor hardly moved in response to pulses of impact from the piezoelectric actuator 58 in the hard disk drive according to the comparative example. On the other hand, the center of gravity of the entire rotor moved at quite a constant rate on every pulse of impact in the hard disk drive 11 according to the specific example, as shown in FIG. 8. A reduction in the friction between the screw head of the clamping screw 36 and the clamp 34 serves to balance the rotation of the magnetic recording disks 13 as expected.

The clamping screws are regularly screwed after the establishment of the balance of the rotation of the magnetic recording disks. A relatively large friction is inevitably generated between the screw heads of the conventional clamping screws and the clamp as well as between the screw stems of the conventional clamping screws and the threaded bores. The clamp is sometimes forced to move when the clamping screws are being screwed even after the establishment of the balance. The movement of the clamp causes a rotational instability beyond a predetermined permissible level. In addition, the clamping screws cannot exhibit an axial force or clamping force of a sufficient intensity even after the application of the regular fastening torque. A relative movement is inevitably caused between the magnetic recording disks and the spindle hub in response to the application of an impact to the hard disk drive.

A reduced friction can be established between the clamping screws 36 and the clamp 34 according to the present invention as described above. The clamp 34 is thus reliably prevented from moving when the clamping screws 36 are being regularly screwed. The balance of the rotation is maintained. In addition, an axial force or clamping force of a larger intensity can be established in the individual clamping screw 36. The clamping screws 36 enable a reliable fixation of the clamp 34 and the magnetic recording disks 13 after the application of the regular fastening torque. The balance of the rotation of the magnetic recording disks 13 can be maintained regardless of the application of an impact to the hard disk drive 11.

The clamping screw 36 may be utilized for fixation of any other component or components located within the hard disk drive 11, for example. A first component may be formed as a part of the enclosure body 12, for example. Threaded bores may be formed in the enclosure body 12 for receiving the clamping screw 36. Otherwise, the clamping screw 36 may be utilized in an electronic apparatus such as a printer, a semiconductor producing apparatus, a micromachine, and the like.

What is claimed is:

1. A storage medium drive comprising:
an enclosure;
a first component enclosed in the enclosure, said first component defining a threaded bore;
a second component enclosed in the enclosure, said second component kept in contact with the first component;
a clamping screw screwed in the threaded bore of the first component for fixation of the second component onto the first component; and
a lubricating agent film located at least in a space between the threaded bore and the clamping screw, said lubricating agent film made of a macromolecular compound having a polar end group.

2. The storage medium drive according to claim 1, wherein said macromolecular compound is perfluoropolyether.

3. The storage medium drive according to claim 2, wherein the lubricating agent film is located in a space between the clamping screw and the second component.

4. The storage medium drive according to claim 3, wherein the lubricating agent film has a thickness in a range from 0.5 nm to 10.0 nm.

5. The storage medium drive according to claim 4, wherein the lubricating agent film is formed on a surface of the clamping screw.

6. A storage medium drive comprising:
   an enclosure;
   a rotating body enclosed in the enclosure, said rotating body supported on the enclosure for relative rotation;
   a storage medium enclosed in the enclosure, said storage medium mounted on the rotating body;
   a clamp fixed to a tip end of the rotating body, said clamp designed to urge the storage medium against a flange of the rotating body;
   a clamping screw screwed in the rotating body to urge the clamp toward the flange; and
   a lubricating agent film located in a space between the clamping screw and the clamp, said lubricating agent film made of a macromolecular compound having a polar end group.

7. The storage medium drive according to claim 6, wherein said macromolecular compound is perfluoropolyether.

8. The storage medium drive according to claim 6, wherein the lubricating agent film has a thickness in a range from 0.5 nm to 10.0 nm.

9. The storage medium drive according to claim 6, the lubricating agent film is formed on a surface of the clamping screw.

10. A method of aligning a center of gravity of a storage medium, comprising:
    screwing a clamping screw in a threaded bore defined in a rotor of a spindle motor in a storage medium drive, said clamping screw penetrating through a clamp, said clamp serving to urge a storage medium against a flange of the rotor;
    driving the spindle motor for rotation of the storage medium so as to detect a rotational instability of the storage medium; and
    applying an impact to the storage medium drive in a direction perpendicular to a rotation axis of the rotor depending on the rotational instability, wherein
    a lubricating agent film is located in a space between the clamping screw and the clamp, said lubricating agent film made of a macromolecular compound having a polar end group.

* * * * *